May 23, 1944.  F. A. M. HEPPNER  2,349,725
HYDROKINETIC TORQUE TRANSMITTING DEVICE
Filed Jan. 27, 1941  2 Sheets-Sheet 1

INVENTOR
Fritz Albert Max HEPPNER
BY
ATTORNEY

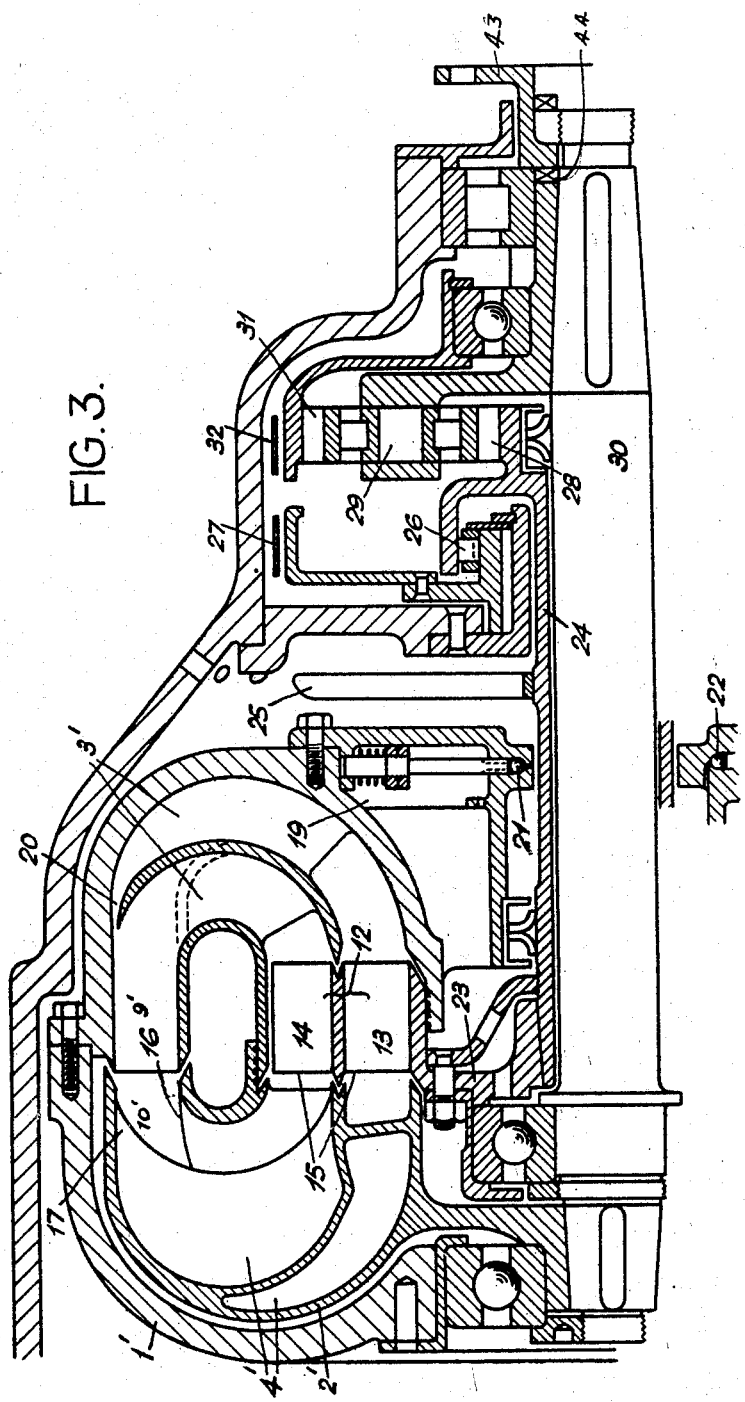

Patented May 23, 1944

2,349,725

UNITED STATES PATENT OFFICE 2,349,725

HYDROKINETIC TORQUE TRANSMITTING DEVICE

Fritz Albert Max Heppner, Onchan, Isle of Man

Application January 27, 1941, Serial No. 376,192
In Great Britain February 6, 1940

7 Claims. (Cl. 74—189.5)

This invention relates to hydrokinetic torque transmitters having a substantially toroidal liquid circuit.

One object of the invention is to achieve high efficiency, and therefore an economical ratio of size and weight to power transmitted, by eliminating needless changes in the vortex speed of the liquid.

With this object in view a principal feature of my invention is a construction of a wheel for a torque transmitter in which liquid channels which are arranged in a number of concentric rows in the inner part of the toroidal circuit are interlaced without reversal of their smooth curve so that they come to lie in a single row in the outer part of the toroidal circuit.

This feature of the invention is applicable alike to fluid couplings and to torque converters. A further feature of the invention is a torque converter having the fluid channels of its pump and turbine wheels interlaced as just described, and having a reaction wheel interposed between them at the inner part of the toroidal circuit, which reaction wheel also is formed with a number of rows of liquid channels.

Yet another object of the invention is to provide a simple means of reversing the direction in which the torque converter drives its load. To this end the invention includes a torque converter in which the reaction member can be permitted to turn backward, at the same time that it is geared by reduction gearing to the load shaft driven by the turbine.

These and other objects and features of the invention will appear in greater detail from embodiments of the invention described below, by way of example, with reference to the accompanying drawings in which—

Figure 1 is a diagrammatic vertical axial section of a coupling according to the present invention, the right hand wheel being in section on the line I—I of Fig. 2.

Figure 2 which is a diagrammatic axial elevation of the right hand wheel of Figure 1 illustrating the arrangement of channels in the pump wheel of the coupling;

Figure 3 is a section similar to Figure 1, of a torque converter embodying the invention suitable for use as an automobile gear, and including means for reversing the drive;

Corresponding reference numerals are used for designating corresponding parts in the various figures of the drawings.

Figure 1:
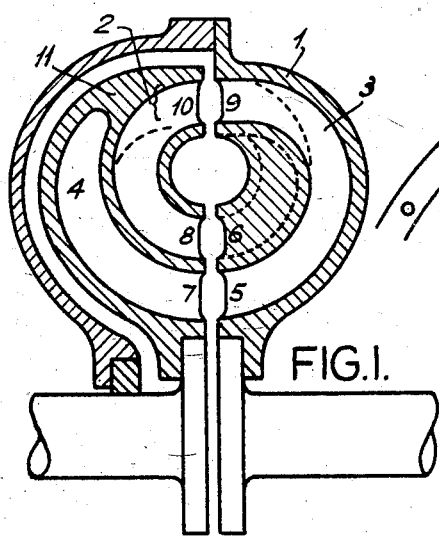
Figure 2:
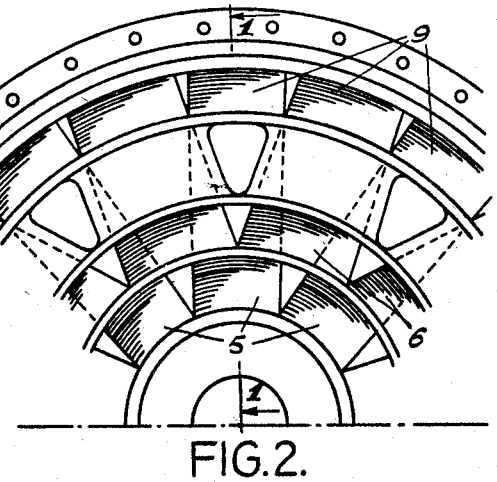

In Figures 1 and 2, 1 and 2 are the pump and turbine wheels, respectively, of a hydraulic coupling, coacting in a substantially toroidal fluid circuit, and containing channels 3 and 4 respectively. The inner ends of these channels are arranged in staggered relation at the centre part of the system in two concentric rows 5, 6 and 7, 8, respectively, each channel being conducted separately from, but interlaced with, its neighbours to the outer part, where the channels form a single row 9, 10. There are no blades between the channels in the usual meaning of the word, but only peculiarly shaped chunks 11 of material. In other words the shape of the metal is more readily defined by attending to the form and relation of the channels in it, than that of the channels by description of the shape of the metal. It will be seen that the channels each curve smoothly through an arc of substantially two right angles about a circular torus axis concentric with the wheel axis, and thereby form a substantially toroidal fluid circuit. Inasmuch as the channels differ from each other they may be considered to form parts of two toroidal circuits of different inner diameters and the same outer diameter, alternate channels in the outer ring belonging to the same circuit. While, therefore, the two wheels present a substantially toroidal outer surface, it will not be smooth save at parts of the maximum radius; elsewhere, if the thickness of the channel walls is constant, the surface will be corrugated, stepping outward around the channels which begin at 5 and inward where it encloses the channels which begin at 6.

The two wheels 1 and 2 may be constructed in any desired way of any desired material such as pressed, and preferably reinforced, synthetic resin. Hollows may be left, for example as indicated at the core of the circuit in Figure 1, which will become filled with liquid in operation.

It will be evident from the foregoing description that the cross-section of the channels is not, as usual, governed by a designed shape of blade between them, but is definable at the will of the designer; in particular he may keep it not only substantially constant in area but also substantially constant in shape throughout its length, the latter feature being unobtainable with the usual construction of the wheels.

The principle of design just described as applied to a hydraulic coupling may also be applied to speed reducing or increasing gears. It will be evident, too, that various alterations in detail may be made within the scope of the invention. Broadly stated, the number of rows of channels at the periphery is always made less than the number of rows at the inner part of the toroidal circuit, by interlacing toward the periphery channels which are staggered at the inner part, but no particular advantage would appear to be generally obtained by increasing the number of rows above that shown in the example.

Figure 4:
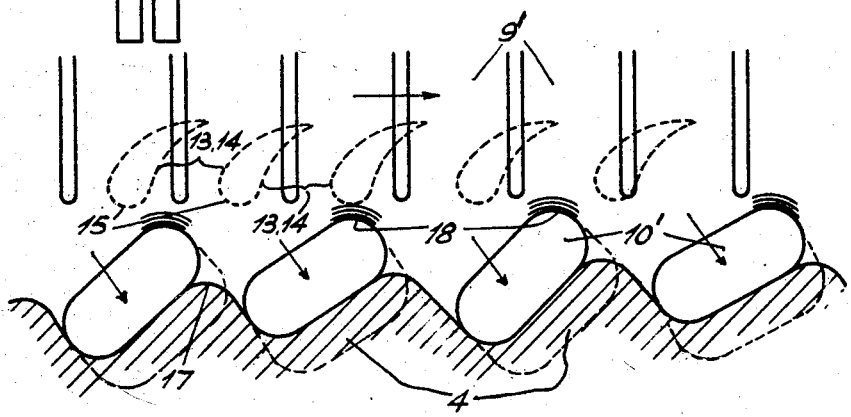
Figure 4 is an evolution or development showing the inlet ends of the turbine channels and the corresponding ends of the pump channels of the torque converter of Figure 3.

An embodiment of the invention in a speed reducing gear, more particularly for use in motor vehicles, is illustrated by way of example in Figures 3 to 6 of the drawings. Figure 4 as above stated is a development; it is taken looking radially inwards upon a cylindrical section surface intersecting the pump and turbine wheels in the outer part thereof.

As will be seen from Figure 3, a hydraulic gear of this type will have in addition to the elements heretofore described, a reaction wheel 12 interposed in the substantially toroidal fluid circuit. This is preferably placed in the centre of the gear, i. e. at the radially innermost part of the fluid circuit. The reaction wheel has two coaxial rows of thick, streamlined blades 13 and 14, the inlet edges 15 of which are well rounded as shown in Figure 4, to provide shockless inflow at varying angles of inlet. Figure 4 indicates the blades 13, 14 as immediately superposed, that is to say as having the same average linear pitch. Since the radii of the rows are different, the angular pitches of the blades in the two rows will be different, and therefore the numbers of blades in the two rows will be different, there being more blades in the outer row.

The channels of the pump member 1', which is connected to the crank shaft of the engine (not shown) and serves also as a rotary housing of the whole hydraulic system, are preferably, though not necessarily, arranged in radial planes through the axis of the unit. The channels of the turbine unit 2' are preferably set at an angle to the turbine axis, as clearly indicated in Figure 4. The curvature of each channel is in one plane, and each alternate plane is set at an angle slightly different from the angle at which the adjacent planes are disposed. The channels leading nearer to the centre of the unit are thus disposed slightly more steeply, that is to say, less inclined to the axis than the other channels, or in other words, the former channels are set at a greater angle to a perpendicular plane transverse to the axis of the whole gear than the latter channels.

To enable the turbine channels to receive and deal efficiently with liquid coming from directions which will differ according to the loading conditions, the side walls which bound the channels are not carried right forward to the inlet ends, that is up to the plane at which the turbine wheel meets the pump wheel, but are cut away down to a surface of revolution (more or less cylindrical) about the axis of the gear, having its generator lying approximately at the outer boundary of the core of the circuit as indicated by the line 16 in Figure 3. This leaves a liquid deflecting shell 17 which as seen in Figure 4 is of zig-zag section. The channels 4 are themselves preferably of a cross-section substantially consisting of two semi-circles connected by parallel lines, as will be clearly seen from the development in Figure 4; this figure shows also that the channels have well rounded inlets 18, and the zig-zag shaped back wall 17 is also well rounded off at the corners, which feature will greatly contribute to obtaining a shockless flow under all working conditions. This rounding is not indicated in Figure 3. Only two corners of the channel cross-section need be sharpened out towards the outlet ends of the channels to provide for an uninterrupted out-flow (see Figure 6). It will be seen that, looked at in the average direction of shock-free inflow, i. e. in the direction of the arrows in Figure 4, the entrance parts of adjacent turbine channels overlap, that is to say, a line drawn in this direction tangential to the rounded end of one channel section will intersect the next adjacent channel section. This increases the useful cross-section of turbine flow, though there is no variation in the cross-section of the channels. A correspondingly increased flow area is needed in the reaction member 23, and, since the height of the channels is kept constant, this is provided by making the mean diameter of the reaction member about the axis of the gear more than half the mean diameter of the peripheral ends 9', 10', of the channels. This feature also renders it possible to make the pump member with well rounded inlet edges.

An oil reservoir 19 is formed outside the pump shell as shown in Figure 3; liquid is drawn from this reservoir into the pump through openings not shown, and is delivered through a narrow gap 20 so shaped as to act as a diffuser with a view to holding the working circuit under pressure. De-gassing means (not shown) are provided to lead air and gases to the centre of the reservoir in a manner which will be obvious to those skilled in the art; and the reservoir carries two centrifugally opened valves 21 and 22, of any suitable design, which serve respectively to give pressure equalization with the outer atmosphere, and to guide liquid that has passed the seals back into the reservoir, in a manner which will be obvious from the drawings.

The hollow shaft 24 of the reaction member 23 carries a fan 25 to provide additional cooling when the unit is used as a brake in a manner which will be described hereinafter. The hollow shaft 24 also carries the rotating part of a one-way brake mechanism 26, to the other part of which is secured a brake drum co-acting with a brake band 27; and the shaft 24 carries in addition the centre or sun wheel 28 of an epicyclic gear, of which the planet wheel carrier 29 is secured to the output shaft 30, and the outer wheel, shown as an internally toothed wheel 31, carries a second break drum co-acting with a brake band 32. Means are provided for applying alternatively one or the other of the two brake bands 27 and 32, and for releasing both at the same time for idling purposes.

When the one-way brake mechanism 26 is braked, the reaction member 23 can only rotate in the direction of the drive, thus providing an automatic change-over of the converter into a coupling. When both bands 27 and 32 are loose, no torque increase can occur; the device can only act as a coupling. When the engine is idling under these circumstances, conditions of flow are such that the liquid enters the pump with great shock losses. The circulation of light is therefore slow, which reduces the drag and the tendency of the vehicle to creep. When the one-way brake mechanism 26 is loose and the internally toothed wheel member 31 held against rotation, the reaction member 23 can turn backward and the backward torque on it multiplied by the ratio of the epicyclic gear 28, 29, 31 is transmitted through the gear to the output shaft 30. The shaft is therefore subject to the forward torque exerted by the turbine upon it and to a multiple of the backward torque upon the reaction member, and the latter being the greater the shaft 30 turns backward.

This reverse position of the gear can also be employed for braking purposes, in which case the reaction member 23 rotates several times faster than the turbine member 2, and acts as an axial-flow pump with, as desirable for the purpose, a low efficiency. No stalling of the engine can occur, owing to the low speed of the liquid under these conditions. The fan 25 on the shaft 24 will rotate at the high speed of the reaction member 23 and thus provide the additional cooling required to dissipate the substantial amount of heat generated under braking conditions by the turbulent flow of liquid.

To avoid unnecessary stresses a final flange 43 by which drive is taken from the gear is dog-clutched at 44 to the member 29.

Figure 5:
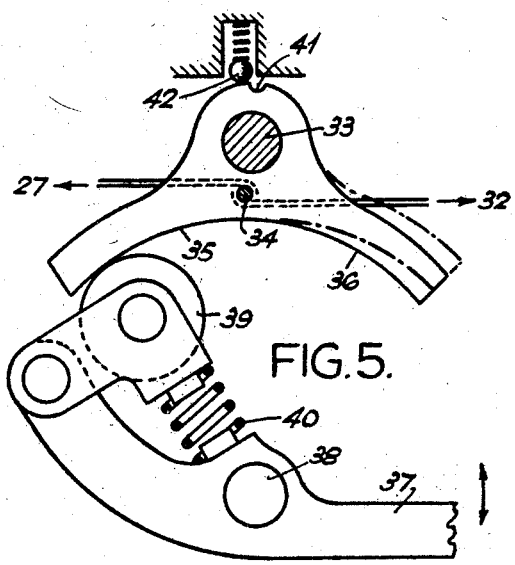
Figure 5 is a diagrammatic elevation of a detail of the reversing means.
Figure 6:
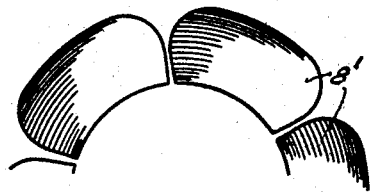
Figure 6 is a fractional end view showing the outlet ends of the turbine channels.

Any suitable well-known mechanism may be used for the alternative application of the two brakes, but it is preferred to employ a mechanism substantially as will now be described with reference to Figure 5.

A rocking shaft 33 is designed to actuate the two brakes, for instance brake bands 27 and 32 respectively, in its two end positions, through eccentric pin 34 or other equivalent means. This rocking shaft carries a cam the surface of which is made up of two arc-shaped paths 35 and 36 of equal radius, which have different centres, and are so arranged that in each end position of the rocking shaft 33 one of the arcs is substantially concentric with the pivot 38 of an actuating lever 37, while the other are projects into the circle defined by the first arc. The actuating lever 37 carries at its end a radially displaceable roller 39 co-operating with the two arcs, and a spring 40 adapted to urge the roller 39 outward.

When the actuating lever 37 is tilted, and its roller 39 thus moved along the arc-shaped paths 35 and 36, the rocking shaft 33 will be tilted from one end position to the other, and since after this movement the roller will move on a path concentric with the pivot 36 of the actuating lever 37, very little force will be required to complete the movement of 37; the further tensioning of the brake band after it has been applied during the tilting of the rocking shaft 33, will be effected only by increasing the length of the acting lever and without appreciable effort by the operator.

A notch 41 and a spring catch 42 co-operating therewith in the mid position of the rocking shaft 33 is preferably provided to allow the rocking shaft to be kept in mid position when it is desired to decrease the drag to prevent the car from creeping when the engine is idling.

It should, of course, be understood that the above examples are given only by way of example, and that the invention is by no means limited to the constructional details described in connection therewith, save as defined by the accompanying claims.

What I claim is:

1. A hydrokinetic torque transmitting device comprising a pump wheel, a turbine wheel and a reaction wheel coacting in a substantially toroidal fluid circuit, said pump and turbine wheels each having channels therein which at the smaller radius lie side by side in a plurality of rows around the wheel axis, the channels of one row being staggered with respect to those of the next, and at the larger radius lie side by side in a single row encircling the wheel axis, said wheels having the same number of rows at their smaller radii, said reaction wheel being located at the radially innermost part of the circuit between the turbine wheel outlets and the pump wheel inlets and itself comprising as many rows of channels as at the smaller radii of said pump and turbine wheels.

2. A hydrokinetic torque transmitting device comprising a pump wheel, a turbine wheel and a reaction wheel coacting in a substantially toroidal fluid circuit, said pump and turbine wheels each having channels therein which at the smaller radius lie side by side in two rows around the wheel axis, the channels of one row being staggered with respect to those of the next, and at the larger radius lie side by side in a single row encircling the wheel axis, said reaction wheel being located at the radially innermost part of the circuit and having two rows of channels aligned with the two respective rows of channels in the other wheels.

3. A hydrokinetic torque transmitting device comprising a pump wheel, a turbine wheel and a reaction wheel coacting in a substantially toroidal fluid circuit, said pump and turbine wheels each having channels therein which at the smaller radius lie side by side in two rows around the wheel axis, the channels of one row being staggered with respect to those of the next, and at the larger radius lie side by side in a single row encircling the wheel axis, said reaction wheel being located at the radially innermost part of the circuit and having two rows of channels aligned with the two respective rows of channels in the other wheels and having different numbers of channels in the two said rows.

4. In a hydrokinetic torque converter, a turbine wheel having channels therein which at the smaller radius lie side by side in two rows around the wheel axis, the channels of one row being staggered with respect to those of the next, and at the larger radius lie side by side in a single row encircling the wheel axis, said channels being set at an angle to the radial but curved in one direction only, the row which is innermost at the smaller radius being set at a steeper angle than those in the other row.

5. A hydrokinetic torque transmitting device including a turbine wheel operating in a substantially toroidal fluid circuit, having its inlets at the larger radius and its outlets at its smaller radius having channels therein which at the smaller radius lie side by side in two rows around the wheel axis, the channels of one row being staggered with respect to those of the next, and at the larger radius lie side by side in a single row encircling the wheel axis, and also having the partition walls between the channels at the inlets cut away down to a cylindrical surface having its generator lying in the outer boundary of the core of the circuit.

6. A hydrokinetic torque transmitting device comprising a pump wheel, a turbine wheel and a reaction wheel all coacting in a substantially toroidal fluid circuit, a final shaft coupled to said turbine wheel, a releasable torque multiplying gear train between said reaction wheel and said final shaft adapted to rotate said shaft in the same direction as said reaction wheel, and control means which in one position both releases said gear train and locks said reaction wheel against backward rotation and in another position engages said gear train and releases said reaction wheel lock.

7. A hydrokinetic torque transmitting device as set forth in claim 6 wherein said torque multiplying gear train is of the planetary type.

FRITZ ALBERT MAX HEPPNER.